US008583375B2

(12) United States Patent
Baule

(10) Patent No.: US 8,583,375 B2
(45) Date of Patent: Nov. 12, 2013

(54) BOX-BASED ARCHITECTURAL DESIGN

(76) Inventor: Gerhard Baule, Camillus, NY (US)

(*) Notice: Subject to any disclaimer, the term of this patent is extended or adjusted under 35 U.S.C. 154(b) by 561 days.

(21) Appl. No.: 12/767,372

(22) Filed: Apr. 26, 2010

(65) Prior Publication Data

US 2011/0112801 A1    May 12, 2011

Related U.S. Application Data

(60) Provisional application No. 61/256,086, filed on Oct. 29, 2009.

(51) Int. Cl.
*G06F 17/50* (2006.01)

(52) U.S. Cl.
USPC .......................................................... 702/1

(58) Field of Classification Search
USPC ............................ 703/1, 2; 700/98, 118, 119
See application file for complete search history.

(56) References Cited

U.S. PATENT DOCUMENTS

| | | | |
|---|---|---|---|
| 5,830,032 A | 11/1998 | Campbell | |
| 6,025,847 A | 2/2000 | Marks | |
| 6,438,922 B1 | 8/2002 | DeLeFevre | |
| 6,741,245 B1 | 5/2004 | Marks et al. | |
| 6,859,201 B1 | 2/2005 | Singh | |
| 6,931,364 B1 | 8/2005 | Anturna | |
| 7,079,990 B2 | 7/2006 | Haller et al. | |
| 7,292,908 B2 | 11/2007 | Borne et al. | |
| 7,433,744 B2 | 10/2008 | Bell | |
| 2003/0009315 A1* | 1/2003 | Thomas et al. | 703/1 |
| 2003/0014224 A1 | 1/2003 | Guo et al. | |
| 2009/0160856 A1* | 6/2009 | Hoguet | 345/420 |

FOREIGN PATENT DOCUMENTS

| | | | |
|---|---|---|---|
| EP | 1047021 A2 | 10/2000 | |
| EP | 1128291 A2 | 8/2001 | |
| KR | 1020030070524 A | 8/2003 | |

OTHER PUBLICATIONS

Welch, Jack, "Digital Canal Building Blocks™ Technology Overview", retrieved on May 21, 2008, 1 page. Available at: http://www.digitalcanal.com/buildingblocks.html.
Welch, Jack, "Digital Canal Building Blocks™ Technology Overview", retrieved on Nov. 5, 2008, 18 pages. Available at:http://www.digitalcanal.com/buildingblocks.html.
Wallace, Alicia, "Google gains visibility", retrieved on Dec. 5, 2007, 2 pages. Available at: http://www.coloradodaily.com/ci_13093417?1ADID=Search www.coloradodaily.com-www.coloradodaily.com#axzz0oN0yWUfy.

* cited by examiner

*Primary Examiner* — David Silver
*Assistant Examiner* — Andre Pierre Louis
(74) *Attorney, Agent, or Firm* — Robert Plotkin, P.C.

(57) ABSTRACT

A computer system automates the creation, modification, and rendering of digital designs of architectural structures. The system uses the mathematical cuboid—a three-dimensional object defined by its width, depth, and height—as its primitive element (fundamental building block). The term "box" is used herein to refer to cuboids. A box, once defined in terms of its width, depth, and height, may be rendered automatically in two or three dimensions. Multiple boxes, and the relationships among them, may be defined, and such multiple boxes may be rendered automatically in accordance with their defined relationships. The user may change any feature in any box—such as the width of one box—and, in response, the entire design may be re-rendered automatically to reflect not only the specific change made by the user to a particular box, but also changes to other boxes necessitated by the user's change.

48 Claims, 11 Drawing Sheets

PLAN VIEW

BOX-BASED ARCHITECTURAL DESIGN

CROSS-REFERENCE TO RELATED APPLICATIONS

This patent application claims priority from U.S. Provisional Patent Application Ser. No. 61/256,086, filed on Oct. 29, 2009, and entitled, "Box-Based Architectural Design," which is hereby incorporated by reference herein.

BACKGROUND

Architects and other designers of homes and other architectural structures traditionally have used drafting techniques to create architectural designs. Such techniques are similar to those of the artist, who draws landscapes and portraits using points and lines. In fact, many architects view themselves first and foremost as artists, and architectural schools continue to base their curricula on an artistic foundation.

Architects who use such traditional techniques would draw a blueprint for a room, for example, by using pencil and paper to draw lines representing the walls of the room. The lines are interconnected to form rectangles and other polygons. Changing the size, shape, location, or orientation of a room requires erasing and redrawing one or more of the lines which make up the room. If multiple rooms have already been drawn, then modifying one room may impact other rooms. As a result, modifying one room may require erasing and redrawing the lines that make up many rooms. Determining where to redraw such lines can be difficult, particularly if the rooms have complex shapes, such as pentagons, or if they are interconnected with each other at unusual angles. As these examples illustrate, traditional architectural drafting techniques are tedious, time-consuming, and error-prone, and are not well-suited for modifying a design quickly and easily after it has been drawn. The problems associated with such techniques are magnified when they are applied to three-dimensional, rather than two-dimensional, drafting.

In response to these and other problems, computer-aided design (CAD) software has long been used to automate and thereby simplify various aspects of the architectural drafting process. At its core, however, conventional architectural CAD software continues to be based on points and lines. Such software, in essence, is a tool for automating the process of drawing points and lines. Although such automation represents some improvement over drafting performed using pencil and paper, conventional CAD software still relies upon the skill and labor of the human architectural draftsman to locate and draw the necessary points and lines of the entire design, and to re-locate and re-draw points and lines throughout a design in response to any changes within the design. As a result, the task of the human architectural draftsman who uses traditional CAD software remains tedious, time-consuming, and error-prone.

SUMMARY

A computer system automates the creation, modification, and rendering of digital designs of architectural structures. The system uses the mathematical cuboid—a three-dimensional object defined by its width, depth, and height—as its primitive element (fundamental building block). The term "box" is used herein to refer to cuboids. A box, once defined in terms of its width, depth, and height, may be rendered automatically in two or three dimensions. Multiple boxes, and the relationships among them, may be defined, and such multiple boxes may be rendered automatically in accordance with their defined relationships. The user may change any feature in any box—such as the width of one box—and, in response, the entire design may be re-rendered automatically to reflect not only the specific change made by the user to a particular box, but also changes to other boxes necessitated by the user's change.

For example, one embodiment of the present invention is directed to a computer-implemented method comprising: (A) creating a first representation of a first shape based on a first width value, a first depth value, and a first height value associated with the first shape, comprising: (A) (1) creating a representation of a first surface of the first shape; (B) associating first coordinates with the first shape; (C) creating a second representation of a second shape based on a second width value, a second depth value, and a second height value associated with the second shape, comprising: (C) (1) creating a representation of a second surface of the second shape; and (C) (2) creating a representation of an attachment of the second surface of the second shape to the first surface of the first shape.

Another embodiment of the present invention is directed to a computer-implemented method comprising: (A) identifying a plurality of representations of a plurality of shapes having a plurality of surfaces; (B) identifying a subset of the plurality of shapes associated with a category of exterior shape; and (C) creating a representation of an exterior outline of the subset of the plurality of shapes.

A further embodiment of the present invention is directed to a computer-implemented method for use with a collection of specifications of shapes. The method comprises: (A) identifying a first one of the specifications of shapes, specifying a first shape; (B) if the collection of specifications specifies at least one second shape which extends the first shape, then extending the first shape by the at least one second shape; and (C) if the collection of specifications specifies at least one third shape which overlaps with the first shape, then subtracting the at least one third shape from the first shape to produce a fourth shape and a fifth shape.

Other features and advantages of various aspects and embodiments of the present invention will become apparent from the following description and from the claims.

DETAILED DESCRIPTION

Embodiments of the present invention provide a framework for automating the creation, modification, and rendering of digital designs of architectural structures. The framework uses the mathematical cuboid—a three-dimensional object defined by its width, depth, and height—as its primitive element (fundamental building block). The term "box" is used herein to refer to cuboids, as described in more detail below.

Figure 4A:
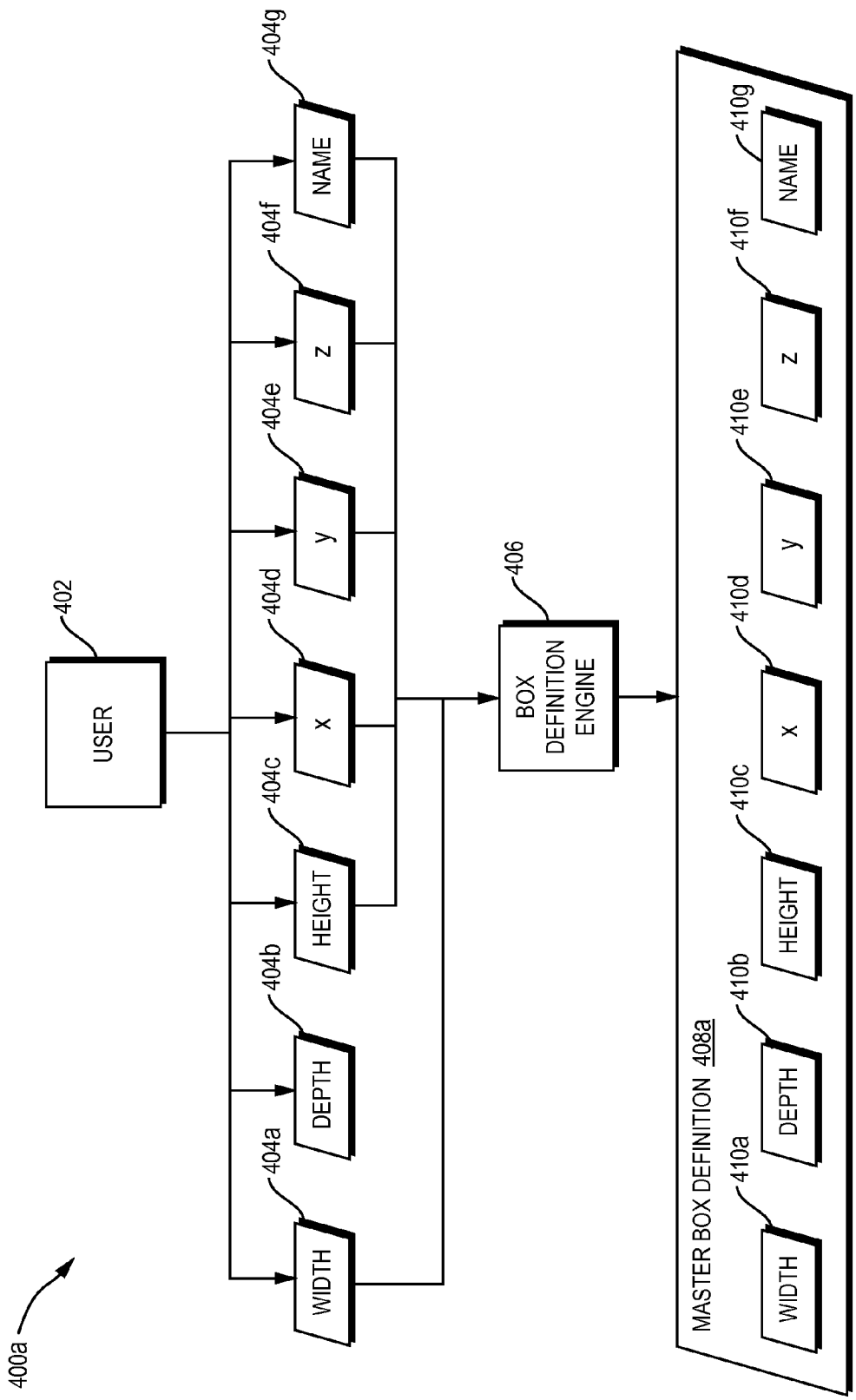
FIGS. 4A and 4B are dataflow diagrams of a system for creating box definitions according to one embodiment of the present invention.
Figure 5:
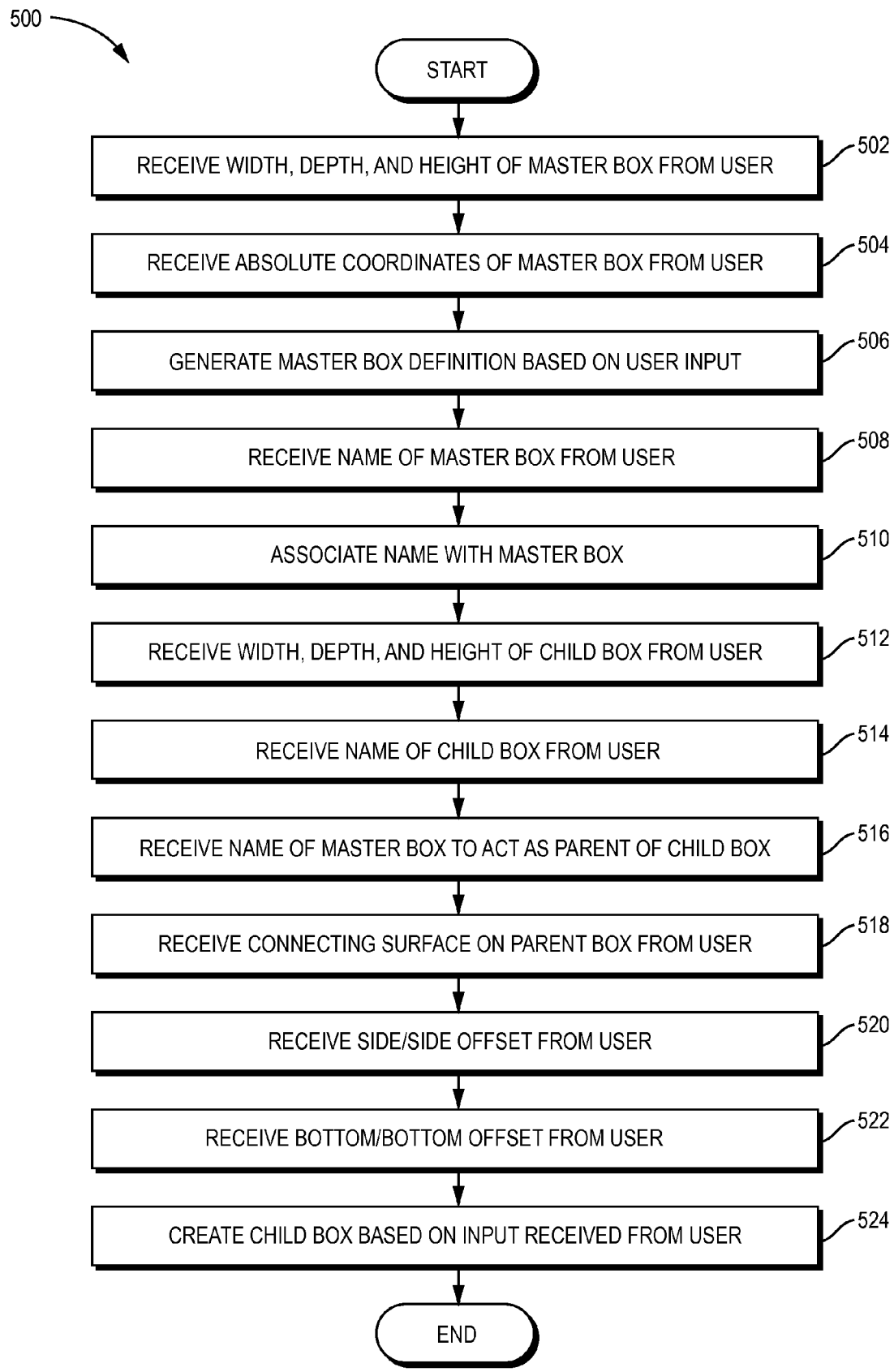
FIG. 5 is a flowchart of a method performed by the system of FIGS. 4A-4B according to one embodiment of the present invention.

A box, once defined in terms of its width, depth, and height, may be rendered in two or three dimensions automatically as a collection of points and lines (and optionally surfaces), without requiring the user to draw or otherwise specify the coordinates of such points, lines, and surfaces. For example, referring to FIG. 4A, a system 400a is shown for creating a definition of a box according to one embodiment of the present invention. Referring to FIG. 5, a method 500 performed by the system 400a of FIG. 4A is shown according to one embodiment of the present invention.

A user 402 of the system 400a provides a width 404a, depth 404b, and height 404c of a "master" box in a design (FIG. 5, step 502). The user 402 also provides absolute coordinates (e.g., x coordinate 404d, y coordinate 404e, and z coordinate 404f) (FIG. 5, step 504). A box definition engine 406 creates, based on the input 404a-f provided by the user 402, a definition 408a of a master box (FIG. 5, step 506). The master box definition 408a represents a box having the properties specified in the user input 404a-f. The master box definition 408a may, for example, contain fields 410a-g containing values corresponding to the input 404a-g provided by the user 402. The master box definition 408a may, however, contain data in addition to and/or instead of the fields 410a-g. For example, the master box definition 408a may include data representing one or more surfaces of the box represented by the master box definition 408a.

Multiple boxes may be defined within a single architectural design, and relationships among such multiple boxes may further be defined within the architectural design. The multiple boxes may be rendered automatically in accordance with their defined relationships, once again without requiring the user 402 to draw or otherwise specify the individual points, lines, and surfaces in the rendering. The user 402 may change any feature in any box—such as the width of one box—and, in response, the entire design may be re-rendered automatically to reflect not only the specific change made by the user 402 to a particular box, but also changes to other boxes necessitated by the user's change, once again without requiring the user 402 to draw or otherwise specify the individual points and lines in the rendering. These and other features disclosed herein fundamentally distinguish embodiments of the present invention from traditional architectural drafting techniques, whether manual or computer-assisted, which use points and lines, rather than boxes, as the fundamental design unit.

The user 402 may provide the input 404a-f defining a box in any way using embodiments of the present invention. For example, the user 402 may create a text file specifying the width 404a, depth 404b, and height 404c of the box using text which specifies numerical values of the box's width, depth, and height. As another example, the system 400a may provide a graphical user interface through which the user 402 may indicate that he wishes to create a box, and which then allows the 402 user to specify the width 404a, depth 404b, and height 404c of the box, such as by typing values of those dimensions into text fields, or by using a mouse to create a three-dimensional representation of the box resembling that shown in FIG. 1A.

These are merely examples of ways in which the user 402 may specify values of a box's dimensions and other features. Regardless of how the user 402 specifies such values, such values may be stored in one or more databases or other appropriate data structures which represent the box definition 408a. Furthermore, note that in all of the examples just provided, it is not necessary for the user 402 to draw or otherwise specify any points or lines to create the box definition 408a or to create renderings of the box represented by the box definition 408a.

The user 402 may also associate names (labels) with boxes. For example, referring again to FIG. 4A, the user 402 may provide a name 404g to the box definition engine 406 (FIG. 5, step 508), in response to which the box definition engine 406 may store the name 404g (or a value derived from it) within the master box definition 408a as name 410g (FIG. 5, step 510).

Figure 1B:
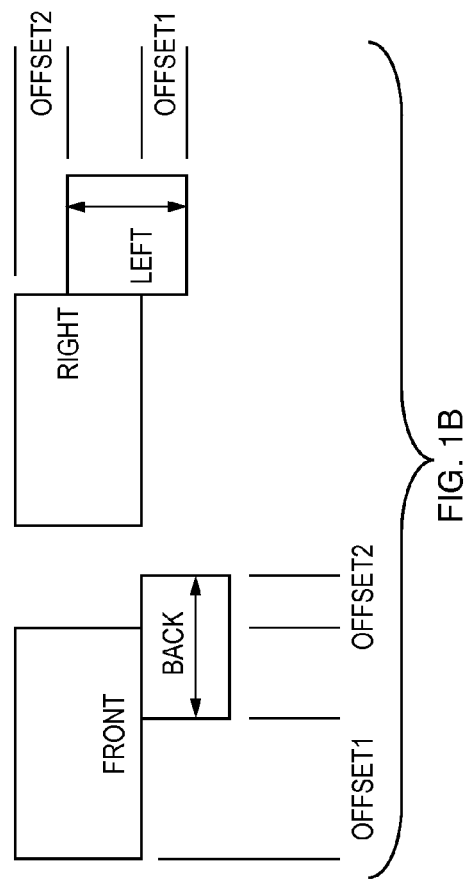
FIG. 1B illustrates an example of a design including two boxes according to one embodiment of the present invention.
Figure 1A:
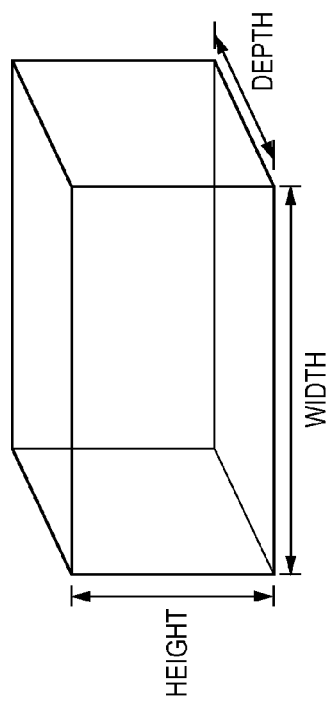
FIG. 1A illustrates a two-dimensional representation of a box according to one embodiment of the present invention.

Referring to FIG. 1A, a two-dimensional representation is shown of a box, such as the master box defined by the master box definition 408a of FIG. 4A. As mentioned above, a box is a three-dimensional object defined by its width, depth, and height. Although only a single box is shown in FIG. 1A for ease of illustration, the same techniques may be used to create multiple boxes. A single "architectural design," as that term is used herein, may include multiple boxes. For example, referring to FIG. 1B, an example is shown in which a simple design includes two boxes. As shown in FIG. 1B, the sides of each box may be labeled with labels such as front, back, left, right, top, and bottom. As described above, the first box may be defined in terms of its width, depth, and height. The first box may also be assigned a name (also referred to herein as a "label"), such as "Living Room," which is a unique identifier among all boxes in the same design. Furthermore, an absolute location (e.g., three-dimensional coordinates) may be associated with the first box.

Figure 4B:
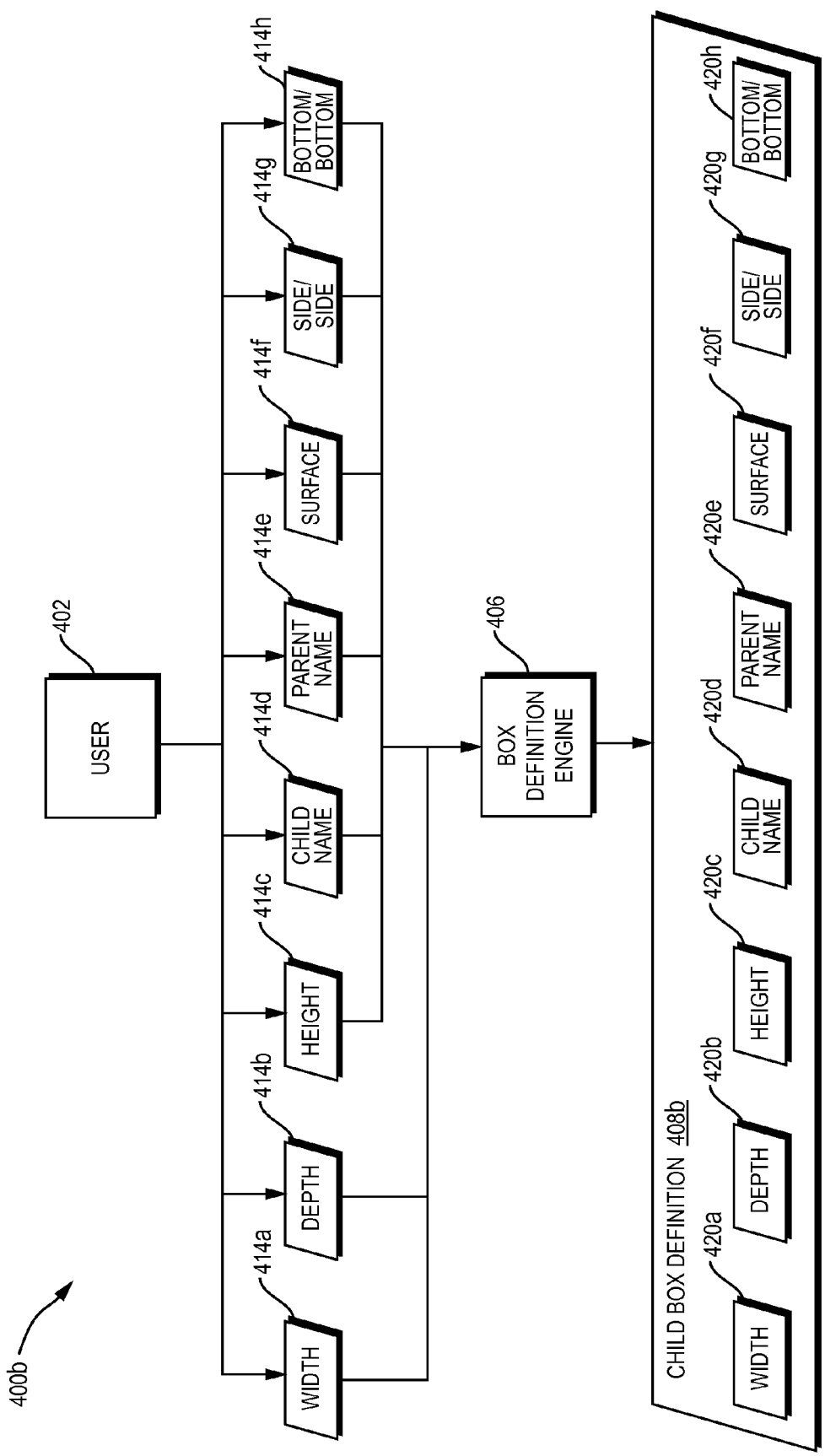

Referring to FIG. 4B, a system 400b is shown for creating a definition of a child box according to one embodiment of the present invention. Note that the systems 400a and 400b of FIGS. 4A and 4B, respectively, may be referred to collectively herein as system 400.

As shown in FIG. 4B, the user 402 may provide a width 414a, depth 414b, and height 414c of the child box (FIG. 5, step 512). The user 402 may also provide a name 414d (e.g., "Dining Room") for the child box (FIG. 5, step 514). The user 402 may further indicate the name 414e (e.g., "Living Room") of the master box that is to be the parent of the child box being defined (FIG. 5, step 516).

The user 402 may provide additional information about the child box, such as: (1) the surface 414f (e.g., "Front" or "Outside-Front") of the master box to which the child box is to be attached (FIG. 5, step 518); (2) a "side/side" offset 414g (which may be zero, positive, or negative) by which the specified side of the child box is to be offset from the specified side of the master box along a first dimension (FIG. 5, step 520); and (3) a "bottom/bottom" offset 414h (which may be zero, positive, or negative) by which the specified side of the child box is to be offset from the specified side of the master box along a second dimension (FIG. 5, step 522).

The box definition engine 406 creates, based on some or all of the input 414a-h provided by the user 402, a definition 408b of a child box (FIG. 5, step 524). The child box definition 408b represents a box having the properties specified in some or all of the user input 414a-h. In the particular example shown in FIG. 4B, the child box definition contains fields 420a-h containing values corresponding to the input 414a-h provided by the user 402. The child box definition 408b may, however, contain data in addition to and/or instead of the fields 420a-h.

The process described above effectively creates a dependency tree connecting the master box definition 408a and the child box definition 408b, in which the box defined by the child box definition 408b is dependent upon the box defined by the parent box definition 408a. Such a dependency tree may be represented and stored in other ways (such as by using a data structure distinct from the box definitions 408a and 408b). As will be described in more detail below, larger and more complex dependency trees may be created. For example, the box defined by the child box definition 408b may itself have a child, in which case this additional child has an indirect (grandchild) dependency upon the master box defined by the master box definition 408a. As another example, the box defined by the master box definition 408a may have multiple direct children, each of which is a sibling of the other.

It is not necessary to require that all of the input values 414a-h shown in FIG. 4B be explicitly specified by the user 402 for the child box. For example, if the user 402 leaves the "bottom/bottom" offset 414h unspecified, then the corresponding bottom/bottom offset 420h in the child box definition 408b may be given a default value, such as zero. The same is true for other parameters of the child box's definition 408b.

Once the user 402 specifies the attachment surface 414a of the parent box, the corresponding attachment surface of the child box may be identified automatically. For example, if "Outside-Front" is specified as the attachment surface 414f of the parent box, then "Outside-Back" may be identified automatically as the corresponding attachment surface of the child box. This is based on the principle that, when an outside attachment surface is specified, "opposites attract," namely that "opposite" sides of boxes should be attached to each other, where front and back are opposites, left and right are opposites, and top and bottom are opposites. This is also based on the principle that, when an inside attachment surface is specified, "likes attract," namely that "like" sides of boxes should be attached to each other, where front and front are like sides, back and back are like sides, and so on.

Note, however, that any procedure may be used to automatically identify which surface of the child box should attach to a specified surface of the parent box. Alternatively, however, the user 402 may expressly specify an attachment surface for both the parent and child boxes, or only for the child box (in which case the attachment surface of the parent box may be identified automatically).

Furthermore, the user 402 need not expressly specify all of the dimensions of the child box. For example, the user 402 may leave the depth 420b of the child box unspecified, but instead specify both a front edge offset and a back edge offset of the child box, in which case the depth of the child box may be calculated automatically as the difference between the front and back edge offsets. The same is true for left and right offsets and width, and for top and bottom offsets and height.

Figure 2A:
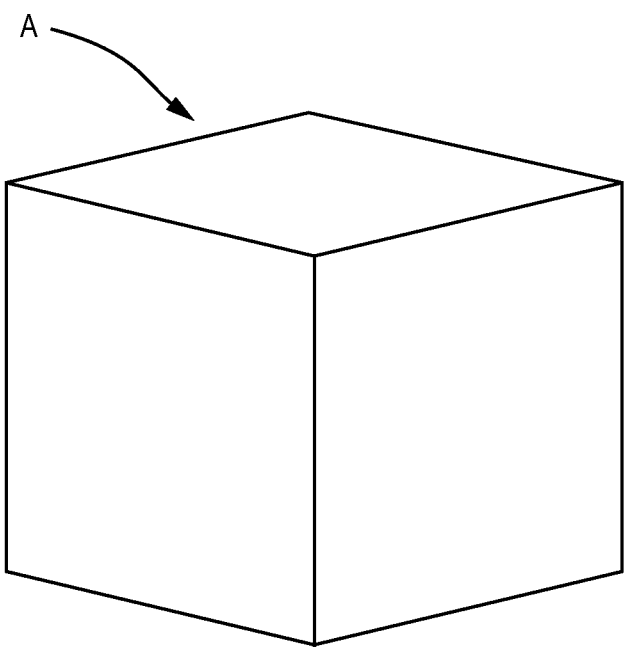
FIG. 2A illustrates a single three-dimensional box according to one embodiment of the present invention.
Figure 2B:
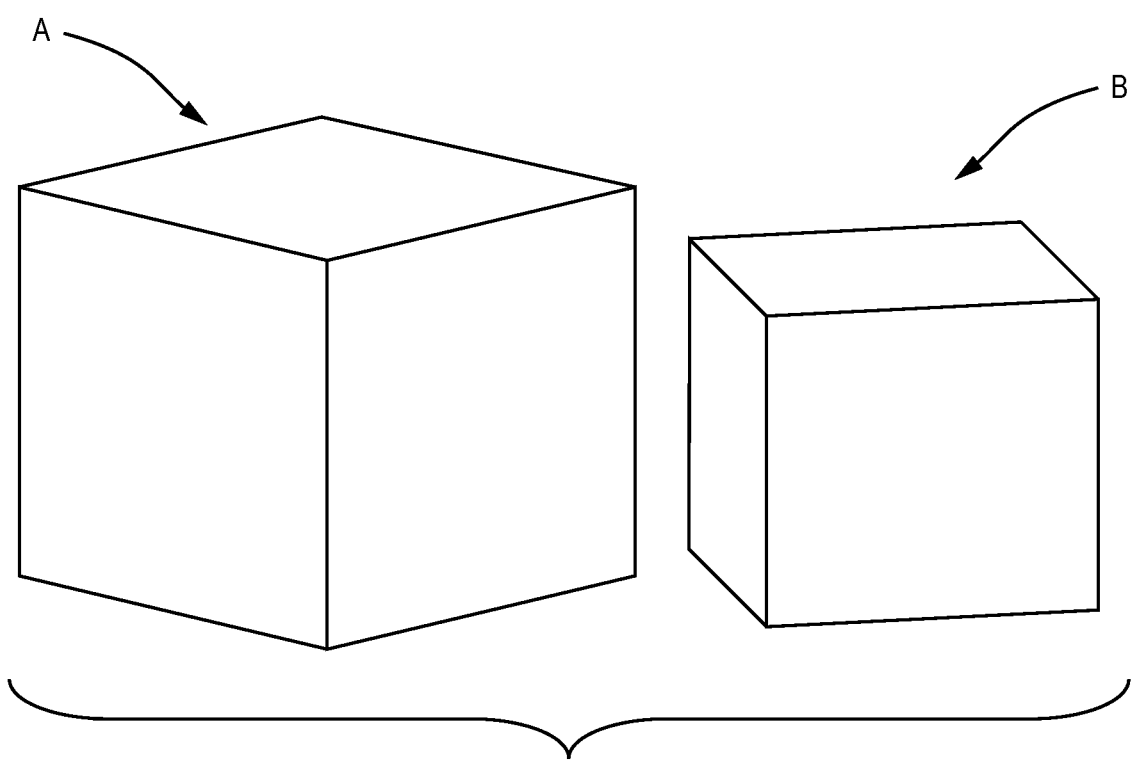
FIG. 2B illustrates the box of FIG. 2A and a second box having coordinates that are relative to the box of FIG. 2A, according to one embodiment of the present invention.

Although FIGS. 1A-1C are shown in plan view for ease of illustration, and therefore appear to illustrate two-dimensional rectangles, they in-fact represent two-dimensional views of three-dimensional boxes, as more clearly shown in FIGS. 2A-2D. FIG. 2A illustrates a single three-dimensional box. This may be a three-dimensional rendering of the parent (e.g., master) box defined by master box definition 408a, having absolute coordinates, shown in FIG. 1A. FIG. 2B illustrates the parent box and a child box, having coordinates which are defined relative to the parent box. The child box may be a three-dimensional rendering of the child box defined by child box definition 408b and shown in FIG. 1B.

Figure 2C:
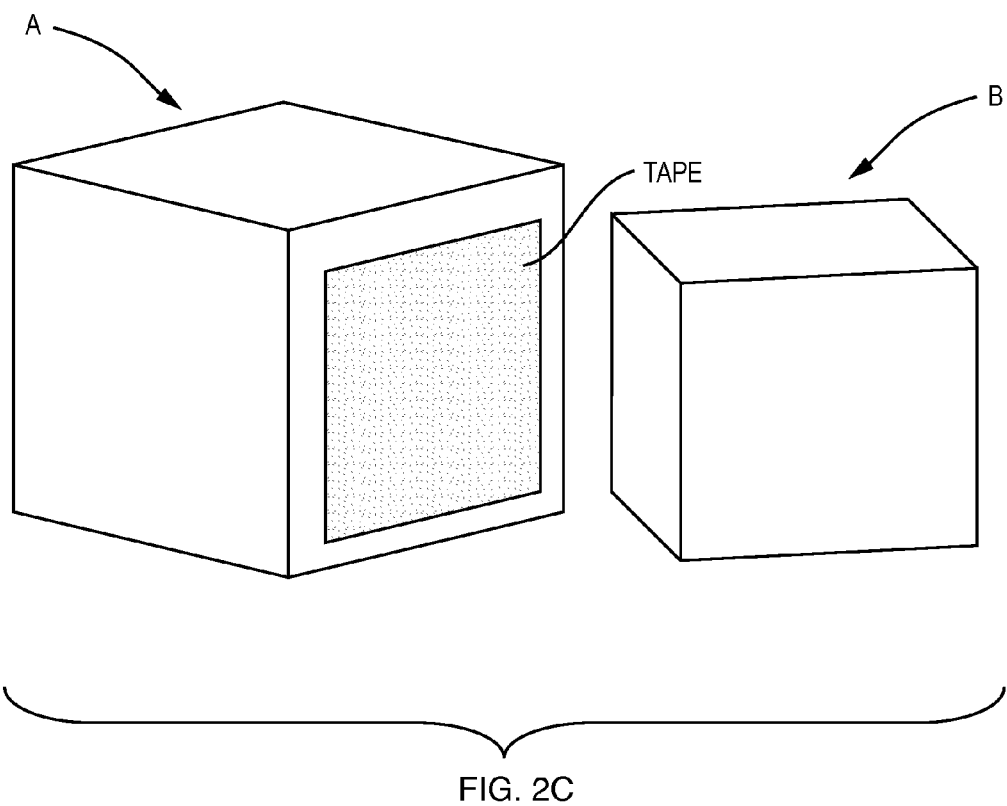
FIG. 2C illustrates the boxes of FIGS. 2A and 2B, highlighting the region of the front side of the box of FIG. 2A to which the back side of the other box is to be attached, according to one embodiment of the present invention.
Figure 2D:
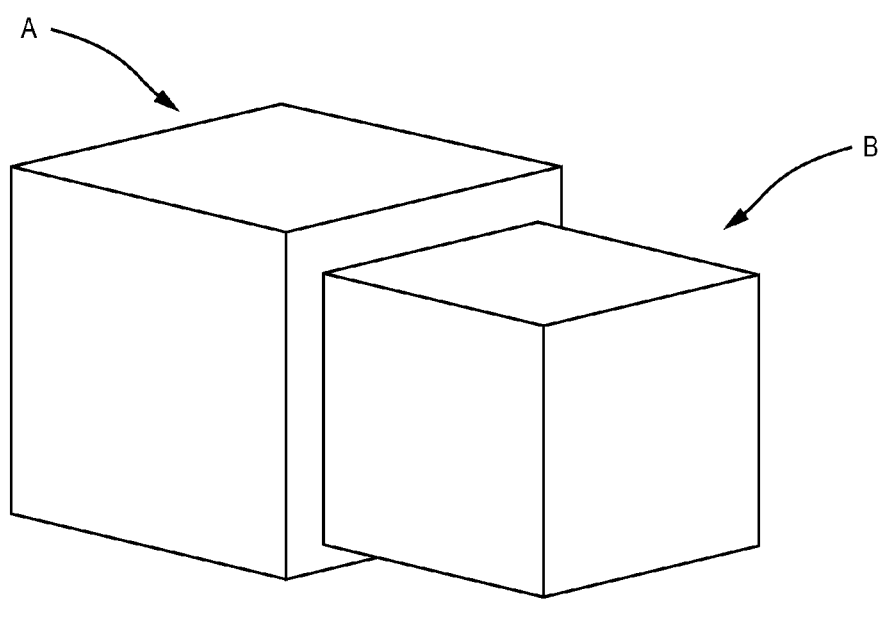
FIG. 2D illustrates the boxes of FIGS. 2A and 2B attached to each other according to one embodiment of the present invention.

FIG. 2C illustrates the same two boxes as FIG. 2B, but further highlights the region of the front side of the parent box to which the back side of the child box is to be attached. This region may be thought of as if it is a rectangular piece of double-sided tape, affixed to the front side of the parent box, so that when the back side of the child box is pressed against the region, the back side of the child box sticks to the region on the front side of the parent box, as shown in FIG. 2D. As the tape analogy implies, if the parent box is moved, the child box will be moved correspondingly and automatically.

Figure 6:
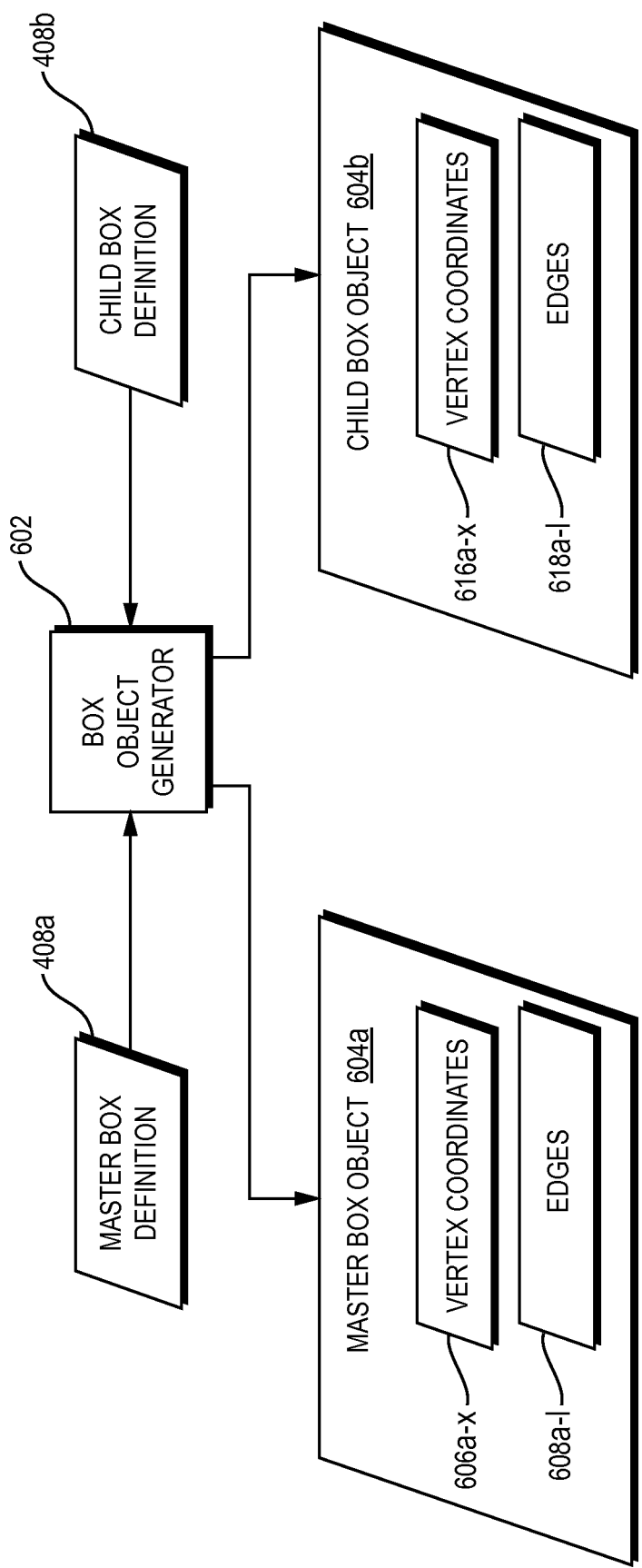
FIG. 6 is a dataflow diagram of a system for creating box objects according to one embodiment of the present invention.
Figure 7:
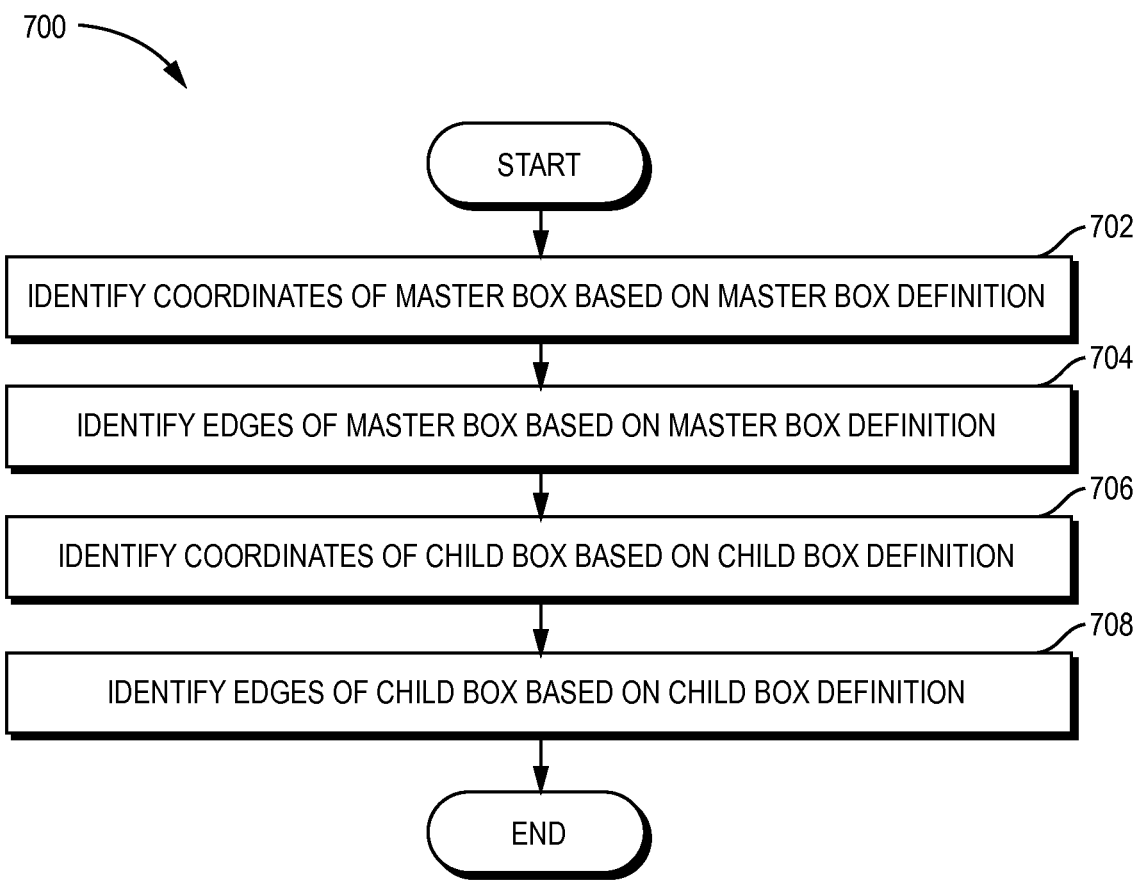
FIG. 7 is a flowchart of a method performed by the system of FIG. 6 according to one embodiment of the present invention.

Referring to FIG. 6, a system is shown for generating box objects based on their definitions according to one embodiment of the present invention. Referring to FIG. 7, a flowchart is shown of a method 700 performed by the system of FIG. 6 according to one embodiment of the present invention. As mentioned above, master box definition 408a defines the width 404a, depth 404b, height 404c, and absolute coordinates 404d-f of the master box. Once these values are defined, a box object generator 602 may generate a box object 604a, representing the master box, which includes the coordinates 606a-x of the eight corner points of the master box (FIG. 7, step 702). The box object generator 602 may identify the coordinates 606a-x based on the master box's width 404a, depth 404b, height 404c, and absolute coordinates 404d-f. Because each corner point needs three coordinates (x, y, and z), this results in a total of 24 numbers 606a-x. The box object generator 602 may further identify the twelve edge lines of the master box and store representations of such twelve edges 608a-l within the master box object 604a (FIG. 7, step 704). Note, however, that although all of these points and lines may be generated automatically and used to create a two- or three-dimensional rendering of the first box, the user need not draw or otherwise specify the coordinates of these points and lines. Instead, all the user need specify is the width, depth, height, and absolute coordinates of the master box—a total of six numbers (width, depth, height, x, y, and z) to produce the 24 numbers necessary to render the box. This is based on the assumption that a convention is followed in which width extends in the positive direction along the x axis, depth extends in the positive direction along the y axis, and height extends in the positive direction along the z axis, originating from the specified x, y, and z coordinates. Alternatively, other conventions may be followed, in which case boxes may be defined using other values.

Similarly, to define the child box, the user 402 need only specify five numbers: the second box's width 414a, depth 414b, height 414c, side/side offset 414g, and bottom/bottom offset 414*h*. Based on these five numbers and the coordinates 606*a-x* of the master box, the box object generator 602 may generate a box object 604*b*, representing the child box, which includes the coordinates 616*a-x* of the eight corner points of the child box (FIG. 7, step 706). The box object generator 602 may further identify the twelve edge lines of the child box and store representations of such twelve edges 618*a-l* within the child box object 604*b* (FIG. 7, step 708). Again, the 24 numbers 616*a-x* needed to render the child box may be produced automatically, without the need for the user 402 to specify any of the 8 corner points of the child box.

As the number of boxes grows, the amount of user labor saved increases significantly. For example, defining three boxes requires the user 402 to specify only 16 (6+5+5) numbers. Yet, from these 16 numbers, the 72 numbers needed to render all three boxes may be calculated automatically. The benefits of such a system may be appreciated when it is considered that the design for a large home containing many exterior and interior boxes may contain dozens of boxes.

Once one or more of the box objects 604*a* and 604*b* are created, the boxes they represent may be rendered based upon the data in the box objects. For example, the data in the master box object 604*a* may be used to produce a rendering of the box represented by the master box object 604*a*. An example of such a rendering is the large box shown in FIG. 2B. Similarly, the data in the child box object 604*b* may be used to produce a rendering of the box represented by the child box object 604*b*. An example of such a rendering is the small box shown in FIG. 2B.

Although only two attached boxes are shown in FIG. 2D for ease of illustration, any number of boxes may be chained to each other in a similar way. Additional boxes may, for example, be attached directly to the "master" (first) box, or be attached indirectly to the master box by being attached directly to boxes (such as the second box in FIG. 2D) which themselves are directly or indirectly attached to the master box. When the master box is moved, all boxes which are directly or indirectly attached to the master box are also moved correspondingly and automatically, by traversing the dependency tree from the master box downward. Although in certain examples provided herein each design contains only a single master box, this is not a limitation of the present invention. A design may include multiple master boxes, where each master box has its own absolute coordinates.

Similarly, for example, if any one or more of the width, depth, or height of a box changes, then all child boxes of that box are automatically moved accordingly. This may be accomplished, for example, by re-calculating the coordinates of the entire design from scratch based on the new dimension(s) of the box whose dimensions have changed, or by re-calculating only the coordinates of the changed box and its descendants. These are merely examples of ways in which the coordinates of the design may be modified automatically in response to modifying one or more dimensions of a box in the design.

This ability to modify the entire design automatically in response to a change in dimension of a single box in the design represents a significant improvement over the state of the art. As mentioned above, when using conventional drafting techniques, whether manual or computer-assisted, changing the coordinates or dimensions of a single room or other element requires the human drafter to manually recalculate and redraw not only the room which has been directly modified, but also all other rooms which surround that room. This represents such a significant limitation of existing systems that architects and their clients often forego making highly desirable changes to architectural designs merely to avoid the time, labor, and expense necessary to create the required changes to the drawings, and to avoid the possibility of introducing errors into the drawings when making such changes. In contrast, embodiments of the invention disclosed herein enable such changes to be made quickly (often instantaneously from the point of view of the user), within no human effort other than the nominal effort required to specify a change in location or dimension of a box, and without any risk of introducing errors.

Related benefits may be obtained in other stages of the process of creating an architectural design. For example, consider that the idealized boxes shown in FIGS. 2A-2D have edges with no thickness (i.e., a thickness of zero). Actual walls in homes and other buildings have non-zero thicknesses. Furthermore, the thickness of walls in a real building may vary from room to room, and may differ for interior and exterior walls. Conventional architectural drafting techniques, whether manual or computer-assisted, are unable to generate walls of varying thicknesses automatically, particularly when walls of different thicknesses join each other at corners. Embodiments of the present invention, in contrast, can do precisely this without requiring any human intervention.

For example, when using embodiments of the present invention, the user may specify that interior walls are to have one user-specified thickness (e.g., 4"), while exterior walls are to have another user-specified thickness (e.g., 6"). Once these values are specified, walls having the specified thicknesses may be generated automatically around all rooms without any further intervention by the user.

Figure 3A:
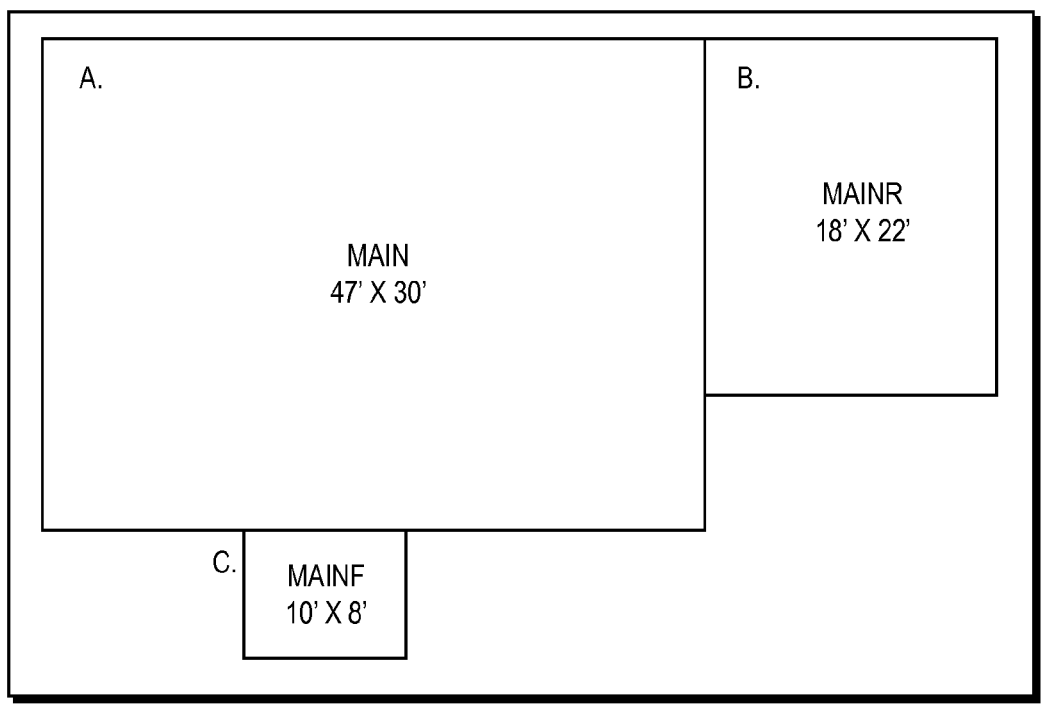
FIG. 3A illustrates three boxes connected to each other according to one embodiment of the present invention.
Figure 3B:
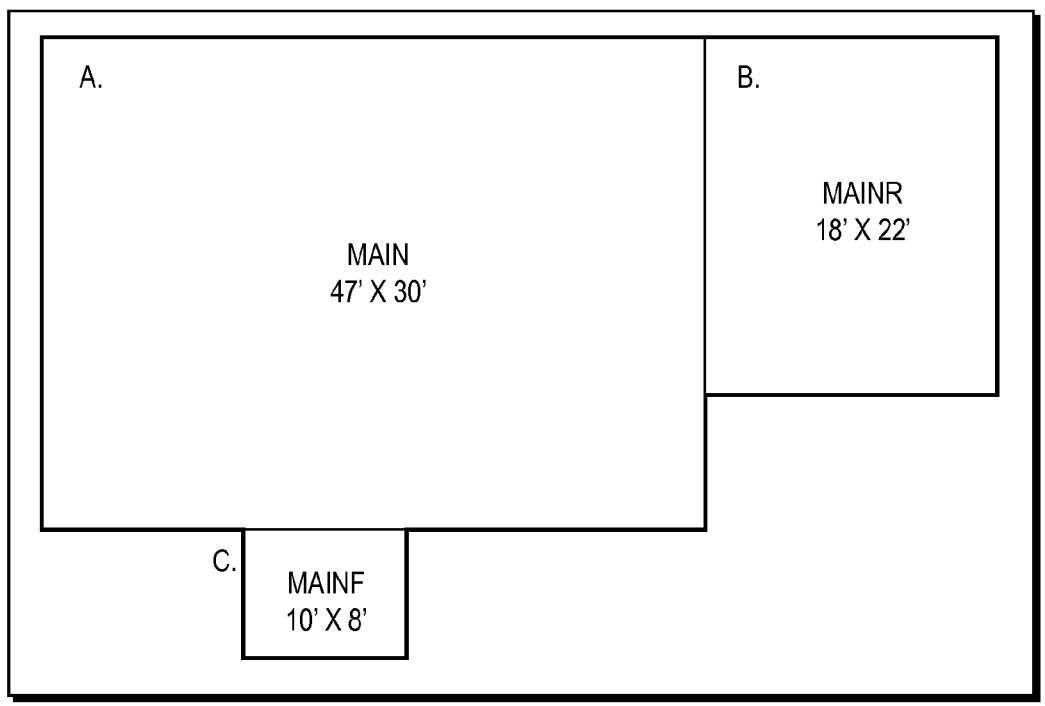
FIG. 3B illustrates the result of tracing an outline around the boxes of FIG. 3A according to one embodiment of the present invention.

For example, consider any two or more boxes which are connected to each other in the manner described above, such as the three boxes illustrated in FIG. 3A. Although in FIG. 3A these boxes are illustrated in two dimensions, they are in fact three-dimensional boxes. To generate exterior walls for such boxes automatically, any known technique for boundary tracing may be used to trace an outline around the exterior of the combined shape formed by the three boxes when shown in the plan view of FIG. 1B. In other words, tracing is performed based only on Outside-Left, Outside-Front, Outside-Right, and Outside-Back surfaces of boxes in the design. The result is shown in FIG. 3B, in which the outline around the boxes represents the outline of the design's exterior surfaces.

Although the examples of boxes shown thus far are useful for creating simple architectural structures, they do not enable easy creation of rooms with interior walls. Boxes may be used to create designs having such rooms using techniques such as the following. Consider the example illustrated in FIG. 3C, in which the boxes labeled "Main," "MainR," and "MainF" in FIG. 3A have been filled with five smaller boxes labeled "Living," "Living^Ext," "Kitchen," "Bed Room," and "Garage." The boxes labeled "Main," "MainR," and "MainF" in FIG. 3A have not necessarily been removed from the design; instead they may simply have been filled with the boxes labeled "Living," "Living^Ext," "Kitchen," "Bed Room," and "Garage" in FIG. 3C. In this case, the "Main," "MainR," and "MainF" boxes may be considered to be "outside" (or "exterior") boxes, while the "Living," "Living^Ext," "Kitchen," "Bed Room," and "Garage" boxes may be considered "inside" (or "interior") boxes. Inside boxes are useful for representing rooms with interior walls.

Furthermore, a room may be formed from a union of two or more boxes. For example, as further shown in FIG. 3C, one box is labeled "Living" and another labeled "Living^Ent." Both of these boxes are examples of "areas" as that term is used herein. In particular, "Living" is an example of a type of shape referred to as an AreaN shape herein, and "Living^Ent" is an example of a type of shape referred to as an AreaX shape herein.

In this particular example, the caret character (""") is used to indicate that the "Living^Ent" box is to be treated as an extension (AreaX) to the "base" (or "root") box (AreaN) having the name preceding the caret (namely, the box labeled "Living"), and therefore is to be joined together with such a box and with any other boxes which are also extensions of the same base box. The shape which results from such joining is an example of a type of shape referred to as an Area shape herein.

Figure 3C:
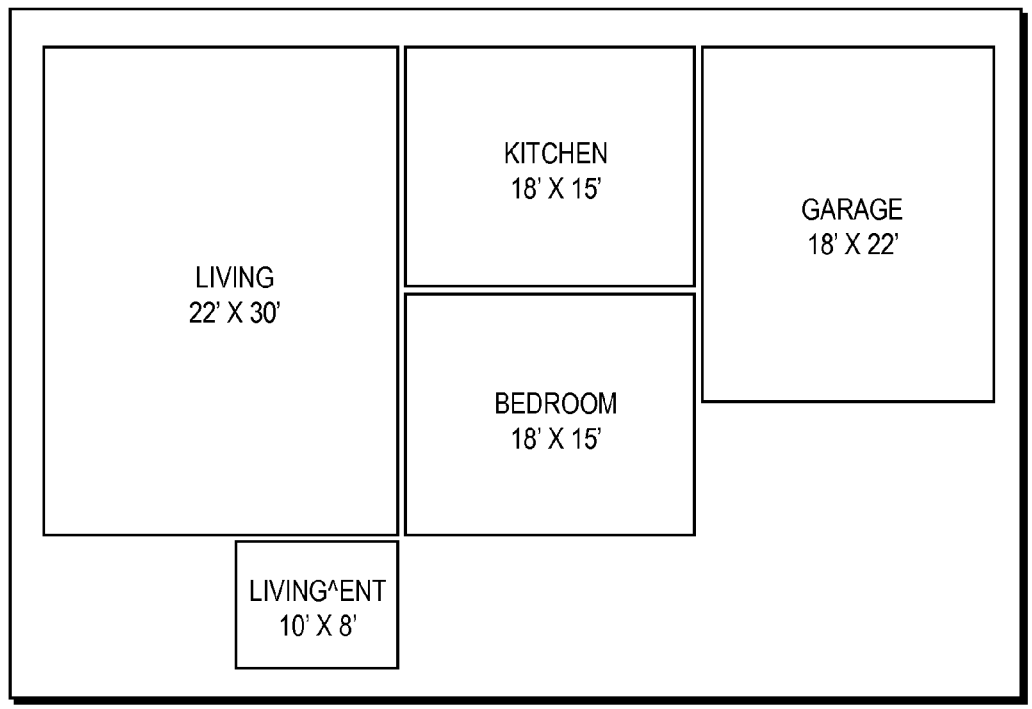
FIG. 3C illustrates boxes which may be used to create rooms according to one embodiment of the present invention.
Figure 3D:
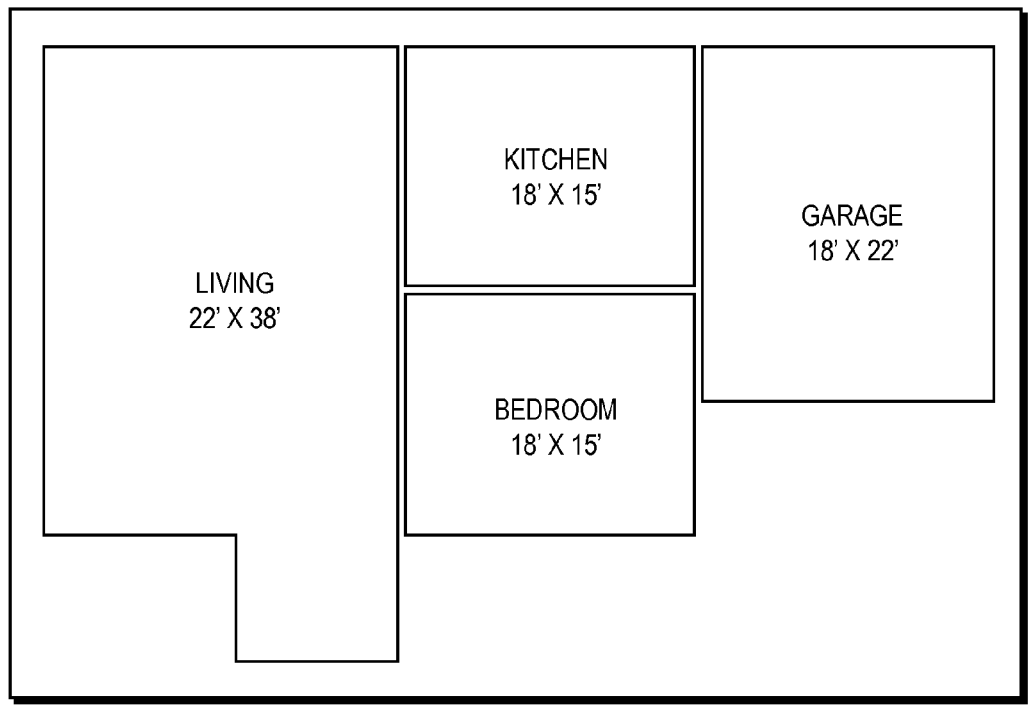
FIG. 3D illustrates rooms created based on the boxes of FIG. 3C according to one embodiment of the present invention.

This is illustrated in FIG. 3D, in which the boxes labeled "Living" and "Living^Ent" from FIG. 3C have been joined together to form the single room labeled "Living" in FIG. 3D. Although the caret character is used in this particular example to indicate that multiple boxes are to be joined together to form a single room, any specifier having any form may be used instead to perform the same function. More specifically, if a shape (such as the "Living" box in FIG. 3C) is of type AreaN, then the AreaN shape may be extended by any one or more AreaX shapes in the design which are designated as extensions of that particular AreaN shape (such as the "Living^Ent" box in FIG. 3C). The result of this joining process is an enlarged AreaN shape. A room shape may then be created from the resulting Area (e.g., AreaN) shape.

Note further that in FIG. 3D, the single inside box labeled "Kitchen" in FIG. 3C has served as the basis for a corresponding room labeled "Kitchen" in FIG. 3D because the "Kitchen" box from FIG. 3C stood alone. The same is true for the "Bed Room" box from FIG. 3C, which has been used to form the "Bed Room" room in FIG. 3D, and for the "Garage" box from FIG. 3C, which has been used to form the "Garage" room in FIG. 3D. In each of these cases, a single box was used to create a corresponding Area shape, which in turn was used to create a corresponding room. As these examples illustrate, a room may be formed from one or more adjacent inside boxes.

Furthermore, although not shown in FIGS. 3C and 3D, shapes may be subtracted from each other in the process of creating rooms. For example, consider an AreaN shape (possibly extended by one or more AreaX shapes) which partially overlaps the AreaM shape. The region of overlap may be subtracted from one of the two shapes, thereby forming two Area shapes which may be used to form two rooms. Since performing such a combination involves subtracting the overlapping region from one of the two original shapes, one of the two original shapes must be selected to have the overlapping region subtracted from it. Such a selection may be made by assigning different priorities to the different shapes, and subtracting the overlapping region from the lower-priority of the two shapes. If the two shapes are a (possibly extended) AreaN shape and a (possibly extended) AreaM shape, and M signifies lower priority than N, then the region of overlap is subtracted from the (possibly extended) AreaM shape. Priorities may, however, be assigned in other ways. The same process may be used when combining any number of shapes, which may overlap with each other in any way, to produce two or more Areas. The resulting Area shapes may then be used to form rooms defined by the Area shapes.

Figure 3E:
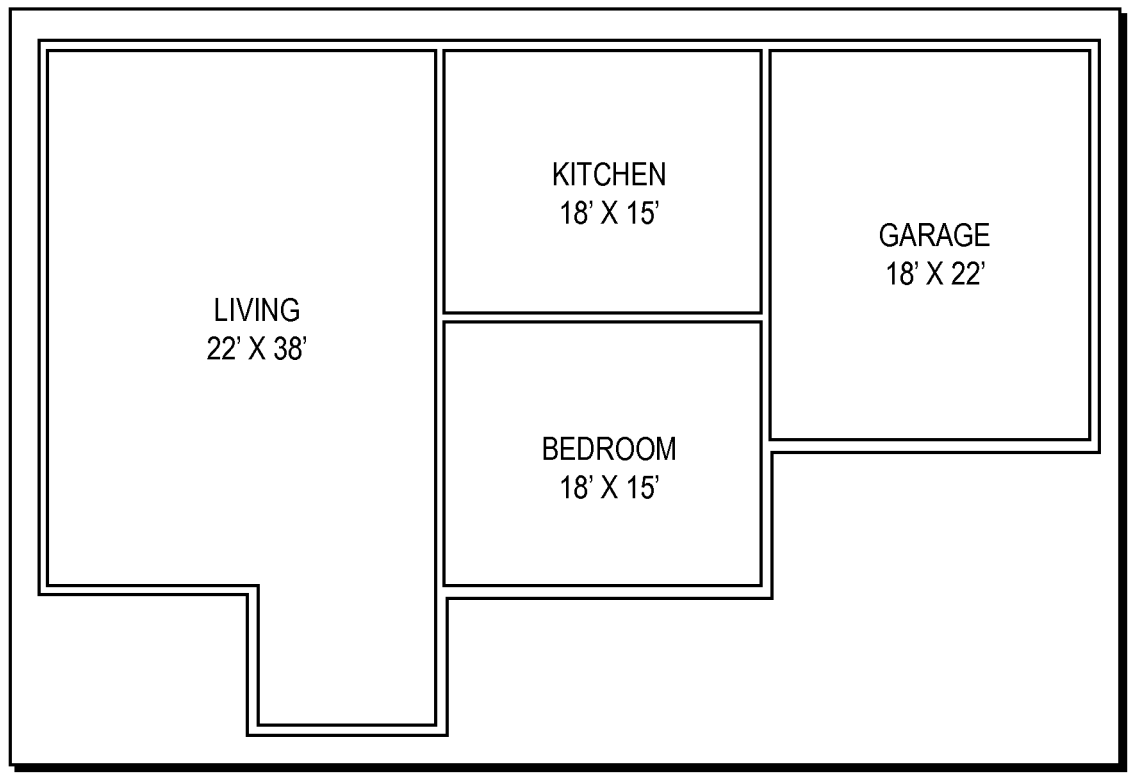
FIG. 3E illustrates walls created around the rooms of FIG. 3D according to one embodiment of the present invention.

Furthermore, the creation of rooms enables all walls to be created automatically. For example, once rooms are created as described above, interior surfaces may be created by performing boundary tracing on the interiors of the formed rooms (i.e., using the Inside-Left, Inside-Front, Inside-Right, and Inside-Back surfaces of those rooms) to create room boundaries. Walls are created by moving each interior room boundary inward (i.e., towards the center of the corresponding room) by an amount equal to one-half of the previously-specified interior wall thickness, and by moving the exterior boundary outward by the exterior thickness less one-half the interior wall thickness. The result of this process, as applied to the rooms shown in FIG. 3D, is shown in FIG. 3E. Note that, as shown in FIG. 3E, some room walls may adjoin both an interior and an exterior wall. For example, part of the right-hand wall of the "BedRoom" room adjoins an interior wall, while part of the same wall adjoins an exterior wall. Because, in the present example, interior walls have a different thickness than exterior walls, the processes described above for generating exterior walls and interior walls automatically results in the interior portion of the right-hand BedRoom wall being thinner than the exterior portion of the right-hand BedRoom wall, as it should be. Such variations in wall thickness are generated automatically as a result of using the techniques disclosed above.

Some designs have one or more "wings" which are angled with respect to the "main" structure at an angle such as 30 or 45 degrees. Embodiments of the present invention may locate and rotate such wings automatically, and create and locate structures which attach the wings to the "main" structure automatically to avoid creating gaps between the wing and the main structure at the location of the angle.

Consider a design which includes a main rectangular box and a second box which is intended to be connected to the main box and angled at 45 degrees with respect to the main box. In this example, the second box's definition may specify the 45 degree angle. This non-zero angle specification may trigger the generation and rendering of a transwedge shape as follows. The main box may be rendered using the techniques disclosed above. Then the second box may be rendered, located at coordinates relative to the first box, and then rotated by the specified angle about a pivot point which is identified automatically based on the attached side of the second box and the sign of the angle. An additional box, referred to herein as a "transwedge" box, may then be generated automatically to exactly fit the gap formed by the angle between the main box and the second box. The transwedge box may, for example, be a triangle or four-sided "dogleg." This transwedge box may be added to the design itself and rendered in accordance with its shape and coordinates. One side of the main box is attached to one side of the transwedge box, and one side of the second box is attached to another side of the transwedge box.

As described above, a definition of a box may be used to automatically calculate the coordinates of the points and lines necessary to render the box. Although a box may be rendered merely as a collection of points connected by lines, one or more of the box's twelve surfaces may also be rendered automatically based on the box's definition. Such surfaces may, for example, be rendered using solid colors, patterns, textures, or in any other manner.

A box may be represented as having twelve surfaces, namely six outside surfaces (outside-top, outside-bottom, outside-left, outside-front, outside-right, and outside-back), and six inside surfaces (inside-top, inside-bottom, inside-left, inside-front, inside-right, and inside-back). This allows inside and outside surfaces of the same side of the box to have different properties (e.g., colors) than each other. Once again, the coordinates and other properties of all such surfaces may be identified automatically based on the box's definition.

Boxes are cuboids. The techniques disclosed herein may be extended to other three-dimensional shapes (such as octagons and round columns), by first packaging the non-cuboid shape within a cuboid-shaped container having a width, depth, and height which are minimally sufficient to contain the non-cuboid shape. This cuboid-shaped container may then be treated in the same way as any of the "native" cuboid-shaped boxes disclosed herein. For example, the cuboid-shaped container may be defined to be attached to a specified surface of another box. The absolute coordinates of the cuboid-shaped container may then be calculated based on the coordinates of the other box in the manner disclosed herein. Once the cuboid-shaped container is located within three-dimensional space, the absolute coordinates of the contained non-cuboid box may be calculated based on the absolute coordinates of the cuboid-shaped box. In other words, the non-cuboid shape moves with its cuboid-shaped container.

When the overall design is rendered, the non-cuboid shape may be rendered, while its cuboid-shaped container may not be rendered. Furthermore, the cuboid-shaped container may be excluded from the process of generating interior and exterior walls. Instead, interior and exterior walls may be generated based on the (non-rectangular) boundary of the non-cuboid-shaped box. The result is the appearance of a non-cuboid shape within the overall design.

When a non-cuboid-shaped box is attached to another box, the back side of the non-cuboid-shaped box may be automatically attached to the specified side of the other box. For example, if a non-cuboid-shaped box is specified to attach to the outside-front side of another box, then the outside-back side of the non-cuboid-shaped box may automatically be identified for attachment to the outside-front side of the other box. Similarly, if a non-cuboid-shaped box is specified to attach to the inside-front side of another box, then the outside-back side of the non-cuboid-shaped box may automatically be identified for attachment to the inside-front side of the other box.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The techniques described above may be implemented, for example, in hardware, software tangibly embodied in a computer-readable medium, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Box definitions may, for example, be created using computer program code written in PROLOG. For example, such code may define two fact bases: one to store the dimensions of boxes, and one to store information about the location of boxes relative to other boxes. For example, each record in the "dimensions" base may include a box name, and the width, depth, and height of the box having that name. Each record in the "location" base may include a box name of a first box, a name of a second box to which the first box adjoins, an identifier of a surface of the second box to which the first box adjoins, a side/side offset, and a bottom/bottom offset. This is merely one example of how such information may be represented. For example, all of this information may be stored in a single database or in more than two databases.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:
1. A computer-implemented method comprising:
(A) creating a first representation of a first shape based on a first width value, a first depth value, and a first height value associated with the first shape comprising:
(A)(1) creating a representation of a first plurality of the first shape, including creating a representation of a first surface of the first shape;
(B) associating first coordinates with the first shape (the system may assign parameters for the model, such as dimensional information height, width, and depth;
(C) creating a second representation of a second shape based on a second width value, a second depth value, and a second height value associated with the second shape, comprising:
(C)(1) creating a representation of a second plurality of the second shape, including creating a representation of a second surface of the second shape;
(C)(2) creating a representation of an attachment of the second surface of the second shape to the first surface of the first shape;
(D) before (C), identifying a second shape specification, the second shape specification specifying a particular one of the first plurality of surfaces;
wherein (C) (2) comprises creating a representation of an attachment of the second surface to the particular one of the first plurality of surfaces, comprising:
(C)(2)(a) selecting a particular one of the second plurality of surfaces of the second shape based on the particular one of the first plurality of surfaces;

13

(C) (2) (b) creating a representation of an attachment of the particular one of the second plurality of surfaces to the particular one of the first plurality of surfaces, wherein the first plurality of surfaces includes a first plurality of inside surfaces and a first plurality of outside surfaces;

wherein (C) 2 (a) comprises:

determining whether the particular one of the first plurality of surfaces is within the first plurality of outside surfaces;

if the particular one of the first plurality of surfaces is determined to be within the plurality of outside surfaces, then selecting, as the particular one of the second plurality of surfaces, one of the second plurality of surfaces on a side of the second shape opposite to a side of the particular one of the first plurality of surfaces of the first shape, wherein a top surface is opposite to a bottom surface, wherein a left surface is opposite to a right surface, and wherein a front surface is opposite to a back surface;

if the particular one of the first plurality of surfaces is not determined to be within the plurality of outside surfaces, then selecting, as the particular one of the second plurality of surfaces, one of the second plurality of surfaces on a side of the second shape that is the same as a side of the particular one of the first plurality of surfaces of the first shape, wherein a top surface is on the same side as another top surface, wherein a bottom surface is on the same side as another bottom surface, wherein a left side is on the same side as another left surface, wherein a right side is on the same side as another right surface, wherein a front side is on the same side another front surface, and wherein a back side is on the same side as another back surface; and (C) (3) modifying, using a computer processor, a shape of a model to create a third representation of the second shape that is rotated by a specified degree of rotation relative to the first shape, wherein the rotation includes automatically identifying a pivot point of the second shape based on the attachment of the second surface and a specified sign of angle of rotation, rotating only the second shape about the identified pivot point to automatically create a gap between the second shape and the first shape, and automatically creating a third shape to fit the gap formed by the rotation.

2. The computer-implemented method of claim 1, wherein (A) (1) comprises creating a representation of a first outside surface of the first shape and creating a representation of a first inside surface of the first shape.

3. The computer-implemented method of claim 2, wherein (A) (1) comprises creating representations of six outside surfaces of the first shape and creating representations of six inside surfaces of the first shape.

4. The computer-implemented method of claim 2, wherein (C) (2) comprises creating a representation of an attachment of the second surface of the second shape to the first outside surface of the first shape.

5. The computer-implemented method of claim 2, wherein (C) (2) comprises creating a representation of an attachment of the second surface of the second shape to the first inside surface of the first shape.

6. The computer-implemented method of claim 1, wherein (C) (1) comprises creating a representation of a first outside surface of the second shape and creating a representation of a first inside surface of the second shape.

14

7. The computer-implemented method of claim 6, wherein (C) (2) comprises creating a representation of an attachment of the first outside surface of the second shape to the first surface of the first shape.

8. The computer-implemented method of claim 6, wherein (C) (2) comprises creating a representation of an attachment of the first inside surface of the second shape to the first surface of the first shape.

9. The computer-implemented method of claim 1, further comprising:

(D) before (A), identifying a first shape specification, the first shape specification comprising the first width value, the first depth value, and the first height value; and wherein (A) comprises creating the first representation based on the first shape specification.

10. The computer-implemented method of claim 9, wherein the first shape specification further comprises the first coordinates, and wherein (B) comprises: (1) identifying the first coordinates from the first shape specification, and (2) associating the first coordinates with the first shape.

11. The computer-implemented method of claim 1, wherein the second shape specification further specifies a name of the first shape, and wherein (C) (2) comprises identifying the first shape based on the name of the first shape.

12. The computer-implemented method of claim 1, further comprising:

(D) identifying second coordinates based on the first coordinates of the first shape; and (E) associating the second coordinates with the second shape.

13. The computer-implemented method of claim 12:

wherein (A) (1) comprises creating a representation of a first plurality of surfaces of the first shape;

wherein (C) (1) comprises creating a representation of a second plurality of surfaces of the second shape;

wherein the method further comprises:

(F) before (C), identifying a second shape specification, the second shape specification specifying a particular one of the first plurality of surfaces, a particular one of the second plurality of surfaces, and an offset; and wherein (D) comprises identifying the second coordinates based on the first coordinates of the first shape and the offset.

14. The computer-implemented method of claim 13, wherein (D) comprises selecting coordinates of the particular one of the second plurality of surfaces to be offset from an edge of the particular one of the first plurality of surfaces by the offset.

15. The computer-implemented method of 12, further comprising:

(F) modifying the first coordinates to create modified first coordinates; and (G) in response to (F), modifying the second coordinates based on the modified first coordinates.

16. The computer-implemented method of claim 12, further comprising:

(F) modifying the first width value of the first shape;

(G) in response to (F), modifying the first coordinates to create modified first coordinates; and (H) in response to (G), modifying the second coordinates based on the modified first coordinates.

17. The computer-implemented method of claim 1, wherein (A) further comprises:

(A) (2) creating a representation of edges of the first shape and coordinates of vertices of the first shape.

18. The computer-implemented method of claim 1, wherein (B) comprises associating first X, Y, and Z coordinates with the first shape.

19. The computer-implemented method of claim 1, wherein the first shape comprises a cuboid; wherein (A) further comprises:
(A) (2) creating a representation of a non-cuboid shape contained within the first shape.

20. The computer-implemented method of claim 19, further comprising:
(D) rendering the non-cuboid shape but not the first shape.

21. The computer-implemented method of claim 20, wherein (D) comprises rendering the non-cuboid shape and the second shape, but not the first shape.

22. The computer-implemented method of claim 1, further comprising:
(D) creating a representation of an exterior outline of the first and second shapes.

23. The computer-implemented method of claim 22:
wherein (A) (1) comprises creating representations of six outside surfaces of the first shape, including a first front surface, a first back surface, a first left surface, a first right surface, a first top surface, and a first bottom surface;
wherein (C) (1) comprises creating representations of six outside surfaces of the second shape, including a second front surface, a second back surface, a second left surface, a second right surface, a second top surface, and a second bottom surface; and
wherein (D) comprises creating the representation of the exterior outline based on the first front surface, the first back surface, the first left surface, the first right surface, the second front surface, the second back surface, the second left surface, and the second right surface.

24. A non-transitory computer-readable medium tangibly storing computer-readable instructions, wherein the computer readable-instructions are executable by a computer processor to perform a method comprising:
(A) creating a first representation of a first shape based on a first width value, a first depth value, and a first height value associated with the first shape comprising:
(A)(1) creating a representation of a first plurality of the first shape, including creating a representation of a first surface of the first shape;
(B) associating first coordinates with the first shape (the system may assign parameters for the model, such as dimensional information height, width, and depth;
(C) creating a second representation of a second shape based on a second width value, a second depth value, and a second height value associated with the second shape, comprising:
(C)(1) creating a representation of a second plurality of the second shape, including creating a representation of a second surface of the second shape;
(C)(2) creating a representation of an attachment of the second surface of the second shape to the first surface of the first shape;
(D) before (C), identifying a second shape specification, the second shape specification specifying a particular one of the first plurality of surfaces;
wherein (C) (2) comprises creating a representation of an attachment of the second surface to the particular one of the first plurality of surfaces, comprising:
(C) (2) (a) selecting a particular one of the second plurality of surfaces of the second shape based on the particular one of the first plurality of surfaces;
(C) (2) (b) creating a representation of an attachment of the particular one of the second plurality of surfaces to the particular one of the first plurality of surfaces, wherein the first plurality of surfaces includes a first plurality of inside surfaces and a first plurality of outside surfaces;
wherein (C) 2 (a) comprises:
determining whether the particular one of the first plurality of surfaces is within the first plurality of outside surfaces;
if the particular one of the first plurality of surfaces is determined to be within the plurality of outside surfaces, then selecting, as the particular one of the second plurality of surfaces, one of the second plurality of surfaces on a side of the second shape opposite to a side of the particular one of the first plurality of surfaces of the first shape, wherein a top surface is opposite to a bottom surface, wherein a left surface is opposite to a right surface, and wherein a front surface is opposite to a back surface;
if the particular one of the first plurality of surfaces is not determined to be within the plurality of outside surfaces, then selecting, as the particular one of the second plurality of surfaces, one of the second plurality of surfaces on a side of the second shape that is the same as a side of the particular one of the first plurality of surfaces of the first shape, wherein a top surface is on the same side as another top surface, wherein a bottom surface is on the same side as another bottom surface, wherein a left side is on the same side as another left surface, wherein a right side is on the same side as another right surface, wherein a front side is on the same side another front surface, and wherein a back side is on the same side as another back surface; and
(C) (3) modifying, using the computer processor, a shape of a model to create a third representation of the second shape that is rotated by a specified degree of rotation relative to the first shape, wherein the rotation includes automatically identifying a pivot point of the second shape based on the attachment of the second surface and a specified sign of angle of rotation, rotating only the second shape about the identified pivot point to automatically create a gap between the second shape and the first shape, and automatically creating a third shape to exactly fit the gap formed by the rotation.

25. The non-transitory computer-readable medium of claim 24, wherein (A) (1) comprises creating a representation of a first outside surface of the first shape and creating a representation of a first inside surface of the first shape.

26. The non-transitory computer-readable medium of claim 25, wherein (A) (1) comprises creating representations of six outside surfaces of the first shape and creating representations of six inside surfaces of the first shape.

27. The non-transitory computer-readable medium of claim 26, wherein (C) (2) comprises creating a representation of an attachment of the second surface of the second shape to the first outside surface of the first shape.

28. The non-transitory computer-readable medium of claim 26, wherein (C) (2) comprises creating a representation of an attachment of the second surface of the second shape to the first inside surface of the first shape.

29. The non-transitory computer-readable medium of claim 24, wherein (C) (1) comprises creating a representation of a first outside surface of the second shape and creating a representation of a first inside surface of the second shape.

30. The non-transitory computer-readable medium of claim 29, wherein (C) (2) comprises creating a representation of an attachment of the first outside surface of the second shape to the first surface of the first shape.

31. The non-transitory computer-readable medium of claim 29, wherein (C) (2) comprises creating a representation of an attachment of the first inside surface of the second shape to the first surface of the first shape.

32. The non-transitory computer-readable medium of claim 24, wherein the method further comprises:
   (E) before (A), identifying a first shape specification, the first shape specification comprising the first width value, the first depth value, and the first height value; and
   wherein (A) comprises creating the first representation based on the first shape specification.

33. The non-transitory computer-readable medium of claim 32, wherein the first shape specification further comprises the first coordinates, and wherein (B) comprises: (1) identifying the first coordinates from the first shape specification, and (2) associating the first coordinates with the first shape.

34. The non-transitory computer-readable medium of claim 24, wherein the second shape specification further specifies a name of the first shape, and wherein (C) (2) comprises identifying the first shape based on the name of the first shape.

35. The non-transitory computer-readable medium of claim 24, wherein the second shape specification further specifies a degree of rotation, and wherein (C) further comprises:
   (C) (3) creating a third representation of the second shape that is rotated by the specified degree of rotation relative to the first shape.

36. The non-transitory computer-readable medium of claim 35, wherein (C) (3) further comprises:
   (C) (3) (a) identifying a pivot point of the second shape;
   (C) (3) (b) rotating the second shape about the identified pivot point, thereby creating a gap between the second shape and the first shape; and
   (C) (3) (c) creating a third shape to fit the gap.

37. The non-transitory computer-readable medium of claim 24, wherein the method further comprises:
   (D) identifying second coordinates based on the first coordinates of the first shape; and
   (E) associating the second coordinates with the second shape.

38. The non-transitory computer-readable medium of claim 37:
   wherein (A) (1) comprises creating a representation of a first plurality of surfaces of the first shape;
   wherein (C) (1) comprises creating a representation of a second plurality of surfaces of the second shape;
   wherein the method further comprises:
   (F) before (C), identifying a second shape specification, the second shape specification specifying a particular one of the first plurality of surfaces, a particular one of the second plurality of surfaces, and an offset; and
   wherein (D) comprises identifying the second coordinates based on the first coordinates of the first shape and the offset.

39. The non-transitory computer-readable medium of claim 38, wherein (D) comprises selecting coordinates of the particular one of the second plurality of surfaces to be offset from an edge of the particular one of the first plurality of surfaces by the offset.

40. The non-transitory computer-readable medium of claim 37, wherein the method further comprises:
   (F) modifying the first coordinates to create modified first coordinates; and
   (G) in response to (F), modifying the second coordinates based on the modified first coordinates.

41. The non-transitory computer-readable medium of claim 37, wherein the method further comprises:
   (F) modifying the first width value of the first shape;
   (G) in response to (F), modifying the first coordinates to create modified first coordinates; and
   (H) in response to (G), modifying the second coordinates based on the modified first coordinates.

42. The non-transitory computer-readable medium of claim 24, wherein (A) further comprises:
   (A) (3) creating a representation of edges of the first shape and coordinates of vertices of the first shape.

43. The non-transitory computer-readable medium of claim 24, wherein (B) comprises associating first X, Y, and Z coordinates with the first shape.

44. The non-transitory computer-readable medium of claim 24, wherein the first shape comprises a cuboid;
   wherein (A) further comprises:
   (A) (2) creating a representation of a non-cuboid shape contained within the first shape.

45. The non-transitory computer-readable medium of claim 44, wherein the method further comprises:
   (D) rendering the non-cuboid shape but not the first shape.

46. The non-transitory computer-readable medium of claim 45, wherein (D) comprises rendering the non-cuboid shape and the second shape, but not the first shape.

47. The non-transitory computer-readable medium of claim 24, wherein the method further comprises:
   (D) creating a representation of an exterior outline of the first and second shapes.

48. The non-transitory computer-readable medium of claim 47:
   wherein (A) (1) comprises creating representations of six outside surfaces of the first shape, including a first front surface, a first back surface, a first left surface, a first right surface, a first top surface, and a first bottom surface;
   wherein (C) (1) comprises creating representations of six outside surfaces of the second shape, including a second front surface, a second back surface, a second left surface, a second right surface, a second top surface, and a second bottom surface; and
   wherein (D) comprises creating the representation of the exterior outline based on the first front surface, the first back surface, the first left surface, the first right surface, the second front surface, the second back surface, the second left surface, and the second right surface.

* * * * *

UNITED STATES PATENT AND TRADEMARK OFFICE
CERTIFICATE OF CORRECTION

| | | |
|---|---|---|
| PATENT NO. | : 8,583,375 B2 | Page 1 of 1 |
| APPLICATION NO. | : 12/767372 | |
| DATED | : November 12, 2013 | |
| INVENTOR(S) | : Gerhard Baule | |

It is certified that error appears in the above-identified patent and that said Letters Patent is hereby corrected as shown below:

In the Specification:

In column 3, line 5, delete "invention." and insert -- invention; --, therefor.

In the Claims:

In column 12, line 43, in claim 1, delete "plurality" and insert -- plurality of surfaces --, therefor.

In column 12, line 53, in claim 1, delete "plurality" and insert -- plurality of surfaces --, therefor.

In column 13, line 6, in claim 1, delete "2" and insert -- (2) --, therefor.

In column 13, line 32, in claim 1, delete "side another" and insert -- side as another --, therefor.

In column 14, line 51, in claim 15, delete "12," and insert -- claim 12, --, therefor.

In column 15, line 43, in claim 24, delete "plurality" and insert -- plurality of surfaces --, therefor.

In column 15, line 53, in claim 24, delete "plurality" and insert -- plurality of surfaces --, therefor.

In column 16, line 6, in claim 24, delete "2" and insert -- (2) --, therefor.

In column 16, line 32, in claim 24, delete "side another" and insert -- side as another --, therefor.

Signed and Sealed this
Second Day of September, 2014

Michelle K. Lee
*Deputy Director of the United States Patent and Trademark Office*